US011013216B2

(12) United States Patent
Auer

(10) Patent No.: US 11,013,216 B2
(45) Date of Patent: May 25, 2021

(54) METHOD FOR OBTAINING INFORMATION ABOUT A FARM ANIMAL

(71) Applicant: Smartbow GmbH, Weilbern (AT)

(72) Inventor: Wolfgang Auer, Weibern (AT)

(73) Assignee: Smartbow GmbH, Weibern (AT)

(*) Notice: Subject to any disclaimer, the term of this patent is extended or adjusted under 35 U.S.C. 154(b) by 0 days.

(21) Appl. No.: 16/896,551

(22) Filed: Jun. 9, 2020

(65) Prior Publication Data

US 2020/0296937 A1    Sep. 24, 2020

Related U.S. Application Data

(63) Continuation of application No. 15/532,560, filed as application No. PCT/AT2015/000155 on Dec. 3, 2015.

(30) Foreign Application Priority Data

Dec. 3, 2014 (AT) .................................. A 874/2014
Mar. 27, 2015 (AT) .................................. A 178/2015

(51) Int. Cl.
*A01K 29/00* (2006.01)
*A01K 11/00* (2006.01)
*A61D 17/00* (2006.01)

(52) U.S. Cl.
CPC .......... *A01K 29/005* (2013.01); *A01K 11/006* (2013.01); *A61D 17/002* (2013.01)

(58) Field of Classification Search
CPC .... A01K 29/005; A01K 11/006; A01K 29/00; A01K 11/00; A01K 27/00
See application file for complete search history.

(56) References Cited

U.S. PATENT DOCUMENTS

| 4,618,861 A | 10/1986 | Gettens et al. |
| 7,350,481 B2 * | 4/2008 | Bar-Shalom ......... A01K 29/005 119/859 |
| 10,242,547 B1 | 3/2019 | Struhsaker |

(Continued)

FOREIGN PATENT DOCUMENTS

| CH | 700494 B1 | 9/2010 |
| DE | 3610960 A1 | 10/1987 |

(Continued)

OTHER PUBLICATIONS

"Goldmedaille fur Rumiwatch [Gold medal for Rumiwatch]" dated Nov. 7, 2012, published at least on Mar. 15, 2014, at the Internet address: <http://www.landi.ch/deu/goldmedaille-fuer-quotrumiwatchquot_1250893.shtm>.

*Primary Examiner* — Kristen C Hayes
(74) *Attorney, Agent, or Firm* — Harness, Dickey & Pierce, P.L.C.

(57) ABSTRACT

The invention relates to a method for obtaining information about a farm animal, wherein a device (a) is attached to the head region of an animal, said device containing at least one acceleration sensor by means of which recurring acceleration data is measured, wherein the acceleration data is evaluated using automatic data processing means, and, as an outcome of the evaluation, is indicative of the activities and/or conditions of the animal. The acquired acceleration data is evaluated in order to detect the swallowing processes carried out by the animal.

19 Claims, 2 Drawing Sheets

(56) References Cited

U.S. PATENT DOCUMENTS

Figure 1:
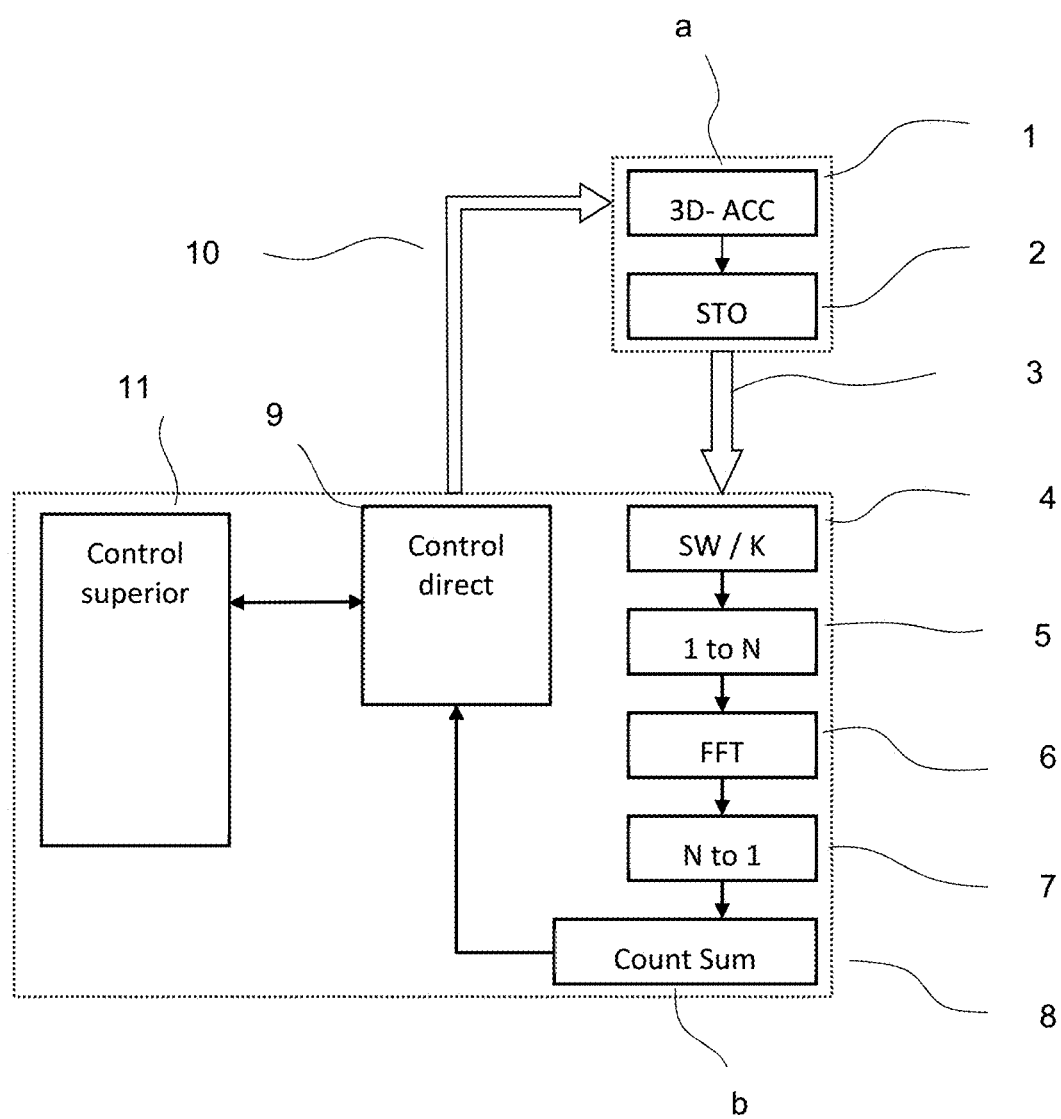

| | | | |
|---|---|---|---|
| 2003/0205208 A1* | 11/2003 | Bar-Shalom | A01K 29/005 |
| | | | 119/859 |
| 2010/0160833 A1 | 6/2010 | Chau et al. | |
| 2013/0014706 A1* | 1/2013 | Menkes | A01K 27/009 |
| | | | 119/859 |
| 2013/0211773 A1 | 8/2013 | Loeschinger | |
| 2014/0306827 A1* | 10/2014 | Inoue | A01K 29/005 |
| | | | 340/573.3 |
| 2017/0095206 A1* | 4/2017 | Leib | A61B 5/02438 |
| 2017/0231198 A1* | 8/2017 | Roisen | A61D 17/002 |
| | | | 702/141 |
| 2019/0098869 A1* | 4/2019 | Forster | A01K 11/004 |
| 2020/0205381 A1* | 7/2020 | Wernimont | A61B 5/742 |

FOREIGN PATENT DOCUMENTS

| | | | | |
|---|---|---|---|---|
| DE | 60133106 T2 | 3/2009 | | |
| EP | 1301068 B1 | 3/2008 | | |
| EP | 2205146 B1 | 4/2011 | | |
| EP | 2007192 B1 | 11/2014 | | |
| WO | 2007119070 A1 | 10/2007 | | |
| WO | 2011069512 A1 | 6/2011 | | |
| WO | WO-2014199361 A1 * | 12/2014 | | A61B 5/1121 |
| WO | WO-2014201039 A2 * | 12/2014 | | H04W 4/026 |
| WO | 2015041548 A1 | 3/2015 | | |
| WO | WO-2015177741 A1 * | 11/2015 | | A01K 29/005 |
| WO | WO-2016036303 A1 * | 3/2016 | | G01P 15/18 |
| WO | WO-2017125805 A2 * | 7/2017 | | A01K 29/005 |

\* cited by examiner

METHOD FOR OBTAINING INFORMATION ABOUT A FARM ANIMAL

CROSS-REFERENCE TO RELATED APPLICATIONS

This application is a continuation application of U.S. patent application Ser. No. 15/532,560 filed on Jun. 2, 2017 which is a National Stage of International Application No. PCT/AT2015/000155, filed Dec. 3, 2015 which is based on and claims the benefit of priority from Austrian Patent Application No. A 874/2014 filed Dec. 3, 2014 and Austrian Patent Application No. A 178/2015 filed Mar. 27, 2015. The entire disclosures of each of the above applications are incorporated herein by reference.

FIELD

The invention relates to a method for obtaining information about a farm animal.

BACKGROUND

The farm animal to which the method is applied can typically be a milk cow; information which is obtained here relates typically to the quantity of feed which is consumed on a daily basis, a information about components of the feed which is consumed, information relating to the milk yield, the time of mating and the optimum insemination time, and information about the rumination activity.

For the execution of the method, an acceleration sensor which measures data repeatedly is attached to the head area of an animal, and wherein the data which is measured by the acceleration sensor on the animal is transmitted to an evaluation station and evaluated in the evaluation station.

U.S. Pat. No. 4,618,861 A has already published the proposal, in 1986, to equip an animal with a movement sensor and to infer on the basis of the automatically observed rate of movements per day whether the animal—typically a cow—is on heat or not. For example, an acceleration-dependent switch suspended from a neck band and which supplies a counting pulse whenever it is accelerated by more than a specific threshold value is proposed as a movement sensor. By means of statistical analysis it is possible to detect a tendency as to whether the animal is likely to be on heat or not likely to be so.

EP 2007192 B1 specifies more wide-ranging ideas with respect to the method known from U.S. Pat. No. 4,618,861 A. By means of sensors which are arranged on the head of an animal, typically a cow, a multiplicity of orientation parameters and movement parameters are measured (acceleration in various directions, distance from the ground etc.) and by evaluation of this primary data it is inferred whether the animal is walking, is standing or is lying down. Characteristic changes in the frequencies of the latter are used to detect the times of the animal being on heat, its fertility and birth. Optionally, further measurements are made, for example about the duration of eating activities, and therefore the inferences are expanded or the accuracy of the inferences is improved.

DE 36 10 960 A1 has already published the idea, in 1987, of equipping an animal in agricultural husbandry with a sensor which repeatedly measures a state variable of the animal and transmits the measurement result to an evaluation point so that the inferences can be made automatically about the state of health of the animal, and for example, the feed can be adapted automatically. The acceleration is mentioned as a possible state variable to be measured; it is integrated over time. The result is interpreted as an average movement of the actual animal. Rumination is not mentioned.

EP 1301068 B1 (priority year 2000) proposes sensing the duration of the rumination of an animal within a relatively long, predetermined time period through noise analysis and drawing inferences about the feed or a state of the animal therefrom. Rumination as such is detected by the difference between the noises of the regurgitation of a bolus and the chewing of a bolus. Disruptive limitations arise owing to the high level of energy consumption due to the long measuring period which is necessary. There is no mention of the measurement of acceleration.

WO2007119070 A1 proposes sensing a multiplicity of different modes of behavior of an animal by means of sensors such as noise sensors, multi-axial acceleration sensors, temperature sensors etc., transmitting these modes of behavior in a wireless fashion to an evaluation unit and inferring a multiplicity of states of the animal by means of evaluation. It is proposed to detect rumination on the basis of the results of noise sensors.

EP 2205146 B1 (priority 2007) proposes attaching a component equipped with a plurality of sensors to the external auditory canal of an animal, said component measuring the temperature at at least two locations and also, in addition, being able to measure other variables such as, for example, noises or accelerations. It is proposed, inter alia, to measure a rumination activity by means of the sensor; however, it is not explained further how the measurement is implemented and which rumination activity this relates to precisely.

DE 601 33 106 T2 (German translation of EP 1 301 068 B1) proposes using a noise sensor and evaluation logic to measure on a ruminant a variable which indicates the activity of rumination and detecting the duration of rumination automatically within a defined time period. The knowledge acquired with this is used to generate information relating to the physiological state of the animal and/or relating to desired changes in the feed in order to optimize the milk yield or to maintain the health of the animal.

In CH 700 494 B1 (priority 2010) it is proposed to equip cattle with a head collar, to the noseband of which a pressure sensor is attached which measures continuously and whose measurement results are recorded by a measuring log. In this way, chewing activity such as, in particular, rumination, can be detected, since in this context the measured pressure profile fluctuates periodically in a characteristic fashion. It is disadvantageous that the head collar has to be fixed very firmly for the pressure measurement to function reliably.

A publication entitled "Goldmedaille for Rumiwatch [Gold medal for Rumiwatch]" dated Nov. 7, 2012 was published, at least on Mar. 15, 2014, at the Internet address http://www.landi.ch/deu/goldmedaille-fuer-quotrumiwatchquot_1250893.shtml. In said publication, the device according to CH 700 494 B1 discussed above is described in combination with further sensors and at least one evaluation unit. For example, monitoring is carried out of how many chewing actions a bolus is chewed during rumination before it is swallowed again. A reduced number of chewing actions per bolus is considered to indicate digestion problems or feeding errors.

In WO 2015041548 A1 which was not published until the priority date of the present application it is proposed to attach different sensors, inter alia also acceleration sensors, to an animal. A type of wellbeing parameter is inferred from analysis of the acceleration data, inter alia by formation of mean values over the individual frequencies determined during a Fourier analysis. Likewise, by using an acceleration frequency the weight of the animal is inferred. It is also proposed to measure the chewing frequency during rumination; however, it is proposed to use noise analyses.

SUMMARY

The general identification of a problem which has led to the invention consists in making available a method for obtaining information about cows, with the aid of which it is automatically possible to monitor and assess the consumption of feed, to assess the milk yield capability of a cow without direct measurement of the quantity of milk and to detect the time when it will be on heat and the optimum insemination time. In comparison with methods which are already available for these purposes, the new method is to be better at supplying reliable information and/or is to entail less unpleasantness and expenditure for the animal and its caretakers.

A more specific object on which the invention is based on making available a method for evaluating sensor data of a sensor which is attached in a device on the head area of a ruminant, wherein the sensor measures a state variable, dependent on the rumination, at the location where the device is attached, and the sensor data is automatically conditioned in such a way that relevant information about the state of health of the animal and/or about an effect of the feed consumed by the animal can be determined from the final result. Compared to the methods which were previously known in this respect, the improvements comprise the fact that significantly less electrical energy is consumed when averaged over time by the device attached to the animal and that there is no need for a head collar carried along on the animal or similar complicated mounting device.

In order to solve the problem it is proposed that acceleration data be recorded at the head area of the animal and evaluated to the effect that swallowing processes which the animal carries out are detected.

Firstly, by counting the swallowing processes it is possible to make very valuable inferences as explained in more detail below. Secondly, by detecting the swallowing processes it becomes possible to identify times between swallowing processes to evaluate only that acceleration data which originates from times between swallowing processes, in order to obtain information about the chewing activity of the animal. Therefore, the information which is obtained about the chewing activity of the animal becomes very accurate and reliable and permits very wide-ranging inferences.

The number of swallowing processes per defined time period, typically per day, correlates very directly to the quantity of feed consumed or ruminated in the time period or the quantity of water drunk. These quantities influence the state of the monitored animal very directly and are influenced much more directly by the respective state of the animal. As a result, the information relating to the state of the animal, which is obtained from the measurements, has a comparatively high level of reliability.

The quantity of feed consumed per time period correlates extremely directly to the expected milk yield in the case of cows.

Reduced consumption of feed per time period is a clear indication of being on heat in the case of healthy animals. Since the time period of being on heat—not only the start but also the end—can be detected well, the optimum time period for the insemination can be detected well. The optimum time period for the insemination coincides with the tolerance phase which starts a day after the end of the heat phenomena and in the case of cows which have per se a very high consumption of feed per time period is shorter, for example four hours, and otherwise approximately twelve hours. As a result of the proposed method according to the invention, useful information about the duration of the tolerance phase is therefore also obtained.

In one preferred development of the method, not only the swallowing processes are counted but also the chewing actions, that is to say the biting actions carried out during a chewing movement.

The ratio of the number of chewing actions to the number of swallowing processes provides, inter alia, statements about the ratio of the portion of raw fiber to the proportion of protein in the feed which is consumed and about the health of the animal. The biting actions carried out during chewing can also be detected on the basis of the evaluation of acceleration data.

In one preferred development of the method, evaluation is also carried out as to whether that the detected swallowing processes and, if appropriate, chewing actions take place during the rumination or during the eating, that is to say the initial consumption of feed. This differentiation can also be detected on the basis of the evaluation of acceleration data. The numerical ratio of the number of chewing actions to the number of swallowing processes is then more informative with respect to proportional nutrition components and/or health of an animal if it applies selectively to eating phases or rumination phases and not as an average value over both types of phase. For example, the ratio of chewing actions to swallowing processes measured only during rumination is known to correlate very strongly to the feed quality, the pH value in the rumen and also with the fat content and protein content in the milk.

In one preferred development of the method, swallowing processes which take place because the animal is drinking are detected and counted separately. These swallowing processes can also be detected on the basis of the evaluation of acceleration data. Since these can be used to make conclusions about the quantity of water consumed, it is possible to improve the inference as to whether otherwise rather dry, raw-fiber-rich feed or instead softer feed, which in a normal case is therefore also richer in protein, has been consumed.

The swallowing phase and chewing phases are preferably differentiated by a variance analysis of the chronological profile of the measured acceleration data. The method can be carried out very well with automatic data processing means and reliably supplies good results.

The number of chewing processes is also preferably measured by carrying out a Fourier transformation for the time period between two swallowing processes over the chronological profile of the measured accelerations, and the fundamental frequency determined here is interpreted as being the chewing action frequency which when multiplied by said time period gives the number of chewing actions which have taken place. The method can be carried out well with automatic data processing means by applying the so-called FFT (Fast Fourier Transformation); even in the case of a low frequency of the underlying acceleration measurements (typically 10 Hz) it also supplies reliable results.

The process of drinking is preferably identified by a variance analysis of the measured acceleration data. In this context, the time profile of the variance is calculated and fluctuations of the variance profile are evaluated in a specific frequency range as an indication of a drinking process, and the detected frequency of the fluctuations is interpreted as a frequency of the swallowing processes during drinking. The method can be carried out well with automatic data processing means and supplies reliable results.

In one preferred development of the method, not only are accelerations measured automatically on the animal but monitoring is also carried out of the animal's location.

Depending on whether the animal is located in a specific place and possibly on how long it has already been there, a greater or smaller amount of acceleration data is recorded and the evaluation of the acceleration data with respect to the determination of specific actions is intensified or reduced. For example, acceleration data does not need to be recorded with respect to possible drinking and evaluated if it is clearly apparent from the monitoring of the location that the animal is located at a place at which there is certainly nothing to drink. Therefore, expenditure of energy on acceleration measurements and transmission of data can be reduced and expenditure on calculations can be avoided, and the trustworthiness of results which are actually obtained can be improved.

The determination of the location of the animal can be carried out, for example, using a system for radio-based location determination which is known per se and in which the animal carries a radio node. Simple and also helpful determination of locations can, however, for example, also be carried out by means of RFID transponders and proximity sensors for the transponders which are attached to the animal. In this context, the proximity sensors are at locations which are characteristic of activities of interest, for example troughs, eating locations, lying locations at which the animals like to ruminate.

In one particularly preferred embodiment of the invention, the acceleration measurement data obtained is evaluated in order to acquire the numerical value of such a quantifiable variable which describes, if appropriate, an instantaneous state of the ruminating process. ("Quantifiable variable" is to be understood as meaning a variable which does not necessarily require numerical data to describe it completely.)

The phase in which a ruminant ruminates is divided into a multiplicity of individual cycles occurring chronologically one after the other, wherein an individual cycle comprises a a phase, a chewing phase and regurgitating swallowing phase. During the regurgitating phase, a quantity of feed which is referred to as a "bolus" is moved from the rumen of the animal into its mouth. During the chewing phase the bolus is comminuted more finely in the mouth by chewing movements. The individual bites which are carried out during the chewing movements are referred to as "chewing actions". During the swallowing phase, the bolus is swallowed again. The chewing phase can be differentiated from the outside compared to the other two phases through, for example, relatively large head movements of the animal which are periodic with the frequency of the chewing actions, and also through characteristic noises.

Since the animal's head is moved in a characteristic way during rumination, the rumination can be recognized principally through the measurement of acceleration.

The sensors which are necessary for measuring acceleration can be fabricated without difficulty and in such a small size that they can readily be placed, for example, in an ear tag (also including a necessary energy accumulator such as typically a battery).

Since knowledge about the duration of the rumination is not aimed at as a final result of the measurement and of the evaluation but rather quantified knowledge about an instantaneous state of a rumination process which is, if appropriate, taking place currently, it is sufficient if chronologically relatively short measurements are carried out only at relatively long time intervals. As a result, a comparatively extremely small expenditure of energy can be found to be sufficient.

In one preferred embodiment, the quantifiable variable obtained by evaluating the sensor data is the number of chewing actions by bolus. This number is known to correlate in the case of cows with the feed quality, the pH value in the ruminant and also the fat content and protein content in the milk.

In another preferred embodiment, the quantifiable variable which is obtained by evaluating the sensor data is the frequency of the chewing actions during the chewing phase in a bolus cycle. This frequency is known to correlate in the case of cows to the feed quality, the pH value in the rumen and also to the fat content and protein content of the milk, in a similar fashion to the number of chewing actions per bolus.

DRAWINGS

Figure 2:
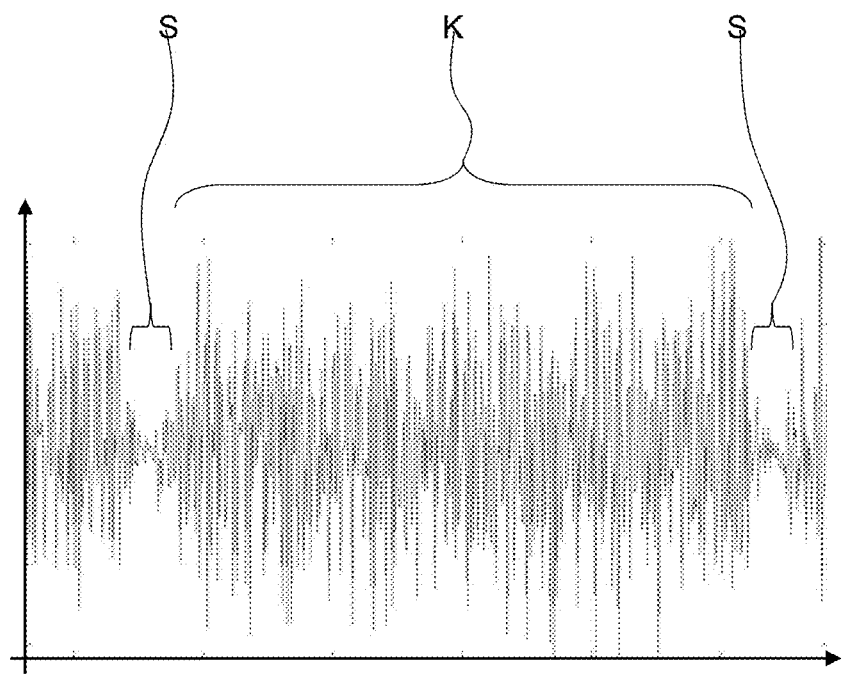

The method according to the invention is explained in more detail below with reference to drawings and the detailed description of the "rumination" example:

FIG. 1: shows a flowchart of the central, cyclically repeating process sequence of an advantageous exemplary method according to the invention, and FIG. 2: shows a profile of the absolute value of the acceleration plotted over time, measured by means of acceleration measurement on an animal which is currently ruminating.

DETAILED DESCRIPTION

The phase in which a ruminant ruminates is divided into a multiplicity of individual cycles occurring chronologically one after the other, wherein an individual cycle comprises a regurgitating phase, a chewing phase and a swallowing phase. During the regurgitating phase, a quantity of feed which is referred to as a "bolus" is moved from the rumen of the animal into its mouth. During the chewing phase, the bolus is comminuted more finely in the mouth by means of chewing movements. The individual bites which are carried out during the chewing movements are referred to as "chewing actions". During the swallowing phase, the bolus is swallowed again. The chewing phase can be differentiated from the outside compared to the other two phases through, for example, relatively large head movements of the animal which are periodic with the frequency of the chewing actions, and also through characteristic noises.

For the method according to the invention, the head movements are measured with the aid of acceleration sensors. The sensors which are necessary for measuring acceleration can be fabricated without difficulty in such a small size that they can readily be placed, for example, in an ear tag (also including a necessary energy accumulator such as typically a battery).

The necessary acceleration sensors are, if required, of course also available for other measurements than for the purpose according to the invention here. Examples of this are gait analyses and the determination of miscellaneous activities or positions of the animal such as e.g. eating, walking or lying.

The position numbers 1 to 11 according to FIG. 1 signify processes which are additionally symbolized in FIG. 1 by labeled boxes or other symbols and occur essentially one after the other in the chronological sequence characterized by arrows.

The upper rectangle is illustrated using dotted lines according to FIG. 1 surround symbols 1, 2 for processes which also take place in the device which is carried along on the animal. The rectangle a therefore symbolizes a device which is carried along on the ruminating animal, typically an ear tag. This device contains at any rate either a plurality of unidimensionally measuring acceleration sensors or at least one multidimensionally measuring acceleration sensor.

The lower rectangle b illustrated using dotted lines according to FIG. 1 surrounds symbols for processes 4 to 11 which ideally occur in an evaluation section which is separate from the animal, typically locationally fixed, and which has a connection 3, 10 to the device on the animal, via which connection bidirectional transmission of data is possible. This connection is typically a wireless radio connection. The rectangle b therefore symbolizes an evaluation station.

In step 1 "3D-ACC" acceleration data is recorded in three coordinate directions which are perpendicular to one another. Good results can be obtained if the measuring frequency is 10 Hz, that is to say if the respective acceleration is measured ten times per second respectively in each of the three coordinate directions.

Step 2 "STO" means the buffering of the data measured in step 1 in a data memory which is located in the device on the animal. For example, acceleration data is measured over a time period of two minutes and is all written into the data memory.

In step 3, a radio link is set up between the device a on the animal and the typically fixed evaluation station b, and the acceleration data which is stored in the device a is transmitted via said link to the evaluation station b.

In step 4 "SW/K" the measured acceleration data, which, of course, represents a chronological profile of accelerations of the device a, are evaluated in order to detect which data can be assigned to chewing phases ("K" in FIG. 2) and which data can be assigned to swallowing/regurgitation phases ("SW" in FIG. 2). During the chewing phases, a nutrition bolus which is located in the mouth of the ruminating animal is finely comminuted by chewing movements. During a swallowing-regurgitation phase, the finely comminuted feed is firstly swallowed and then a new bolus, which is initially composed of feed which has not yet been finely comminuted is regurgitated into the mouth from the rumen. Generally, the swallowing-regurgitation phase is associated with significantly smaller accelerations and changes in acceleration than the chewing phase.

The differentiation between the chewing phases and swallowing-regurgitation phases is very successful by virtue of an adapted form of the variance analysis of the measurement results. For this purpose, in each case a total amount of an overall acceleration is preferably calculated first from the respective three acceleration values which were recorded per measuring time by geometric addition. (A resulting profile of the absolute acceleration over time is shown by way of example in FIG. 2. Two swallowing-regurgitation phases ("SW") and a chewing phase ("K") which lies between these are also marked in FIG. 2.) In each case two partial quantities are used from the total quantity of the data series obtained, at which partial quantities the associated acceleration measurements occur in two adjoining time windows of the measuring time period. In each case the variance is calculated from the two partial quantities. (The variance is the sum of the squares of the distances of the individual values from the mean value over all the individual values divided by the number of individual values). The two obtained variance values which each apply for one of the two time windows are compared with one another. A significant difference in the variance values is an indication that in the region of the boundary between the two time windows there is a transition between a chewing phase and a swallowing-regurgitation phase. These variance calculations are repeated for chronologically shifted pairs of time windows, but the two windows of one pair adjoin one another in each case. In a first stage of the calculation the time window pairs can be shifted from one variance calculation to another by rather large steps so that the entire time range is passed through quickly. For those time ranges for which indications of phase transitions between the chewing phase and swallowing-regurgitation phase are found here, the variance calculations are repeated, wherein from one calculation to the next the time window pairs are shifted by a relatively small time increment, so that the time of the transition between two phases can be set more precisely.

Since the accelerations are, of course, measured independently of what triggered them, even events which are nothing to do with rumination, for example cattle being frightened by a violent event or an ear being shaken in order to scare away a fly, act on the result of the acceleration measurements. So that such events have as little possible effect on the result of the evaluation of the measurements, only those phases between two phases interpreted as swallowing-regurgitation phases are accepted as chewing phases of the rumination for the further evaluation of the rumination, which chewing phases are not shorter than a certain minimum duration (for example 26 seconds) and also not longer than a certain maximum duration (for example 70 seconds).

In steps 5 to 8, operations for the measurement with respect to rumination are there only continued with acceleration data which has been recognized as being associated precisely with one chewing phase in step 4. In addition to the detection of the start and end, this also involved the fact that it was detected that there was no interruption between the start and the end and that the interval between the start and the end is a time period which is realistic for the chewing phases during rumination.

Step 5 "1 to N": three acceleration phases were respectively measured at the individual measuring times in step 1, wherein the individual values represent the acceleration in one coordinate direction in each case. The value triple of a measurement of an individual point in time therefore signifies a vector in the space, the direction of which depends on the ratios between the magnitudes of the three individual acceleration measurements, and the absolute value of which is obtained from geometric addition of the individual components. The respective vector which is defined by the three measured acceleration components, in terms of direction and absolute value, changes from one measuring time to the next. In step 5, it is calculated how large the component of the individual measured acceleration vectors occurring in the respective direction is for a multiplicity of directions which are assumed in the space in a "hedgehog-like fashion", for example a hundred directions. For this purpose, the scalar product of the unit vector (vector with a length of 1) in the respective direction can be calculated with the respective acceleration vector.

Over all the acceleration measurements of a chewing phase this means geometrically that a multiplicity of path profiles is derived from the single curve, running in the three-dimensional space and formed by connecting the tips of the acceleration vectors to one another in a chronologically ordered fashion, wherein each individual path profile occurs on precisely only one direction line in the space and precisely only one path profile occurs on each direction line. (A "direction line" in the space in this sense is a straight line through the origin of the assumed coordinate system).

In step 6 "FFT" (A Fourier transformation) is carried out for each of the many path profiles which were calculated in step 5 and which each occur only along one direction vector in the space. That is to say the profile of a scalar variable (absolute value of the acceleration) over time is no longer represented as a sequence of value pairs of point in time/absolute value of the acceleration but rather as a sum of sinusoidal oscillations which are determined individually by frequency, amplitude and phase, wherein in this case the amplitude symbolizes an acceleration. In a specialist field, in particular what is referred to as an FFT (Fast Fourier Transformation) is best known and has been introduced as an algorithm for Fourier transformation for digital data processing, for which reason more details will not be given on this here. The result of the step 6 is therefore a separate Fourier representation for each of the individual acceleration profiles plotted against the time—which acceleration profiles are each geometrically oriented along an individual direction vector of the direction vectors.

In step 7 "N to 1", that Fourier representation which most clearly shows a frequency distribution from which the chewing rhythm of the currently ruminating animal can be read off is filtered out from the individual Fourier representations (each individual representation of which respectively stands for a direction in the space). This is then the case if, in that frequency range in which the chewing frequency has been found empirically to occur, either a single oscillation relating to the amplitude dominates clearly over all the other oscillations in this frequency range or if in this frequency range only very few oscillations, associated locally with respect to their frequency, dominate clearly in this frequency range with respect to the amplitude over all the other oscillations. In the first case, the frequency of the individual oscillation is the searched-for chewing frequency. In the second case, the chewing frequency can be determined by extending a parabola, the axis of symmetry of which is parallel to the ordinate, in the Fourier representation, through those points through which the three most dominant oscillations are defined (the abscissa corresponds to frequency, the ordinate corresponds to the amplitude). The abscissa value of the location of the apex of the parabola is the searched-for chewing frequency.

In the case of cattle, the chewing frequency in the case of rumination is in the region from approximately 40 to approximately 85 chewing actions per minute (0.67 to 1.42 Hz), typically in the range from 60 to 70 chewing actions per minute (1 to 1.17 Hz).

In step 8 "Count Sum" counters can be reset and obtained if result can be output. The outputting of a result relating to the instantaneous value of a variable describing rumination can be the chewing frequency or still better the number of chewing actions per bolus. In order to be able to specify the number of chewing actions per bolus, the chewing frequency is to be multiplied by the duration of the chewing phase determined in step 4.

A counter counts the chewing actions taking place during rumination. At the value which is already located in this counter, the number of chewing actions determined in the last processing cycle is added. This number is obtained as the calculated chewing frequency multiplied by the duration of the respective chewing phase which is bounded by two swallowing-regurgitation phases, the detection of which took place in step 4.

A second counter counts the swallowing processes taking place during the rumination. At the value already located in this counter, the value 1 is added per swallowing-regurgitation phase.

In step 9 "Control direct", a first subordinate control unit defines when a measuring attempt is to be started again by the device a carried on the animal, and possibly also how long, if appropriate, measurement is to take place. The rules according to which this takes place in step 9 are defined by a superordinate logic process 11 "Control superior" in accordance with the outlined example.

For the monitoring of the state of an animal by determining the number of bites per bolus during rumination it is not necessary to perform measurement continuously. For example, it may be sufficient if the number of chewing actions per bolus during rumination is determined successfully three or four times a day.

If the aim is to find the instantaneous value of a variable which describes the rumination, ideally a logic is stored which starts measuring processes more frequently on the day (for example every half hour) until the number of successful measuring processes at which rumination was actually detected and analyzed has reached the amount which is necessary for one day. Of course, this logic can also be influenced by further processes such as, for example, the age of the animal, indications of it being on heat or chronological proximity to a birth event or suspicion of illnesses. There is ideally also the possibility of this logic being edited by a person using an input device. The described method is therefore highly efficiently in terms of energy consumption in the device a located on the animal because the measurements do not have to be carried out continuously but rather only a couple of times per day so that the operating time of the device a per day can be for example in the range of 1% of the daily duration. It is therefore possible to ensure that the battery in the device a can last for a very long time.

In step 10, a radio link is set up between the (fixed) device b and the device a located on the animal, and the determinations relating to the device a are communicated to the device a. In so far as measurement is not carried out continuously in any case, this relates at least to the time of the next measuring cycle.

The described evaluation of the measurement data according to steps 4 to 8 appears to be costly. However, in fact it is easy to carry out since it can be carried out on a fixed device, for example a PC, and since computing capacity, energy and time can be sufficiently made available very easily therein. As a result of the highly developed evaluation, the risk of incorrect measurements is very low and the measuring accuracy which is achieved is very good even though few, relatively short measuring cycles, at an extremely low measuring frequency (typically 10 Hz) are sufficient on the animal.

The described method for finding out the instantaneous value of a quantifiable variable which describes the rumination can be modified and/or expanded in many respects within the inventive concept. In this respect the following is to be noted:

For example during the evaluation of the data it would be possible to dispense with the detours via the projection of the acceleration vectors to a large number of individual direction vectors (step 5), the Fourier transformations of the accelerations per individual direction vector and the search for the Fourier transformation which is most informative, and instead to measure accelerations with a relatively high measuring frequency in device a (approximately 100 measurements per second instead of 10 measurements) and to find out the times of extreme values through a comparison of the magnitude of successive measurement results and to infer from their intervals the frequency of oscillations and ultimately the chewing frequency or the duration of individual chewing actions. However, owing to the relatively high measuring frequency more energy would be used in device a, and owing to the lower reliability of the acquired measurement results it would be necessary to carry out measurements very much more often and to attempt to achieve sufficient measuring accuracy and reliability of the direction through the formation of averages and through further logic filters. In order to achieve equally good accuracy and reliability the energy consumption per day in the device a located on the animal would therefore be dramatically higher; presumably the hardware in the device a would have to be constructed in a more costly fashion so that more acceleration measurements can be carried out over time and that more measurement results can be buffered. However, a smaller consumption of energy would nevertheless presumably be found to be sufficient than when simply measuring the duration of the rumination per day in a general way.

For example, before a measuring cycle which is to be carried out on the device a in order to record the accelerations during the rumination of at least one bolus, a significantly shorter measuring cycle can be carried out, by means of which it is determined whether there are actually sufficient accelerations for rumination to be possibly occurring. The evaluation in this respect can comprise, for example, the fact that measured values of the accelerations are summed up over a short duration and the result is compared with a threshold value, and can also already be carried out on the device a located on the animal. If in this context it is determined that rumination is in fact definitely not occurring, the pending measurement relating to rumination can be postponed by a defined duration, for example half an hour.

The transmission of data between the device a located on the animal and the evaluation station b does not necessarily have to occur in a wireless fashion by radio. It can, for example, also occur by means of electrical conduction using the animal's body as an electrical conductor as soon as the animal touches an electrode which is in contact with the evaluation station, or at least comes so close to the electrode that capacitive signal transmission is possible.

It is also possible to carry out Fourier transformation on the raw data of the acceleration measurements or on fewer data items from the acceleration measurements to be processed according to FIG. 1. The frequency of the chewing actions can, if appropriate, also be read out to a certain extent from the relevant results, but the result is less accurate and less unambiguous than according to the sequence described with reference to FIG. 1.

For the quantifiable variable which was obtained by evaluating the sensor data and which, under certain circumstances, indicates something about an instantaneous state of the rumination process, in addition to the already described variables "number of the chewing actions per bolus" and "chewing frequency", for example the following variables are also possible within the inventive concept: length of the chewing phase, length of the regurgitation phase, length of the swallowing phase, ratio of said phase lengths with respect to one another, averaged magnitudes of accelerations during individual phases, ratios of magnitudes of accelerations in different phases.

The method which is described in detail for the measurement of the rumination can be applied in a largely analogous fashion for the measurement of the consumption of feed, that is to say eating. The consumption of feed also occurs in repeating sequences of, in each case, a plurality of chewing actions and a swallowing process. Differences with respect to rumination relate to the frequency of the chewing actions (this is higher than in the case of rumination) and the duration between two swallowing processes (this is shorter than in the case of rumination), as well as the fact that a swallowing process takes up less time during the consumption of feed than a swallowing-regurgitation process during rumination.

In the case of the consumption of feed, a lower number of chewing actions between two swallowing processes is an indication of feed which is rich in protein; a larger number of chewing actions between two swallowing processes is, on the other hand, an indication of feed with a relatively high portion of long fibers.

Instead of counting the chewing actions during the consumption of feed, it is also possible to measure the duration between successive swallowing processes. The information about this duration relating to the feed and the state of the animal can be tendentially compared with the information about the numerical ratio from the chewing actions and swallowing processes because a relatively long duration between two swallowing processes goes hand in hand with a relatively high number of chewing actions between two swallowing processes. However, according to previous observations the number of chewing actions per swallowing process appears to be more informative as a basis for comparison between different animals than the duration between two swallowing processes. The chewing frequency from animal to animal appears to fluctuate more greatly than the quantity of feed moved during a swallowing process.

Drinking can be detected extremely well from the measured acceleration data by means of a variance analysis in the form of comparison of the variance within two adjoining time windows, as described above for the example of rumination. Given relatively low acceleration values there is a sequence, which repeats with a slow rhythm, composed of a relatively long suction phase during which virtually no acceleration takes place and a relatively short swallowing phase with a relatively high acceleration. The period duration of a cycle which is composed of sucking and swallowing is typically 5 to 10 seconds in cows.

The superordinate logic process 11 "Control superior" is a superordinate control process. For example, in said process further influencing variables other than only time and acceleration values can be taken into account. Typically events of a localization are taken into account and processed logically as well as prescriptions which can be defined on a user interface in such a way that they can be edited. By virtue of the process 11, further process steps, by which the measured acceleration data is examined and evaluated to determine whether, and if so how, consumption of feed or drinking takes place, can be controlled in parallel with or as an alternative to the process steps 4 to 8.

Likewise, by means of the superordinate process 11 it is possible to detect—typically on the basis of acceleration data—whether rumination, consumption of feed or drinking is at all occurring. If none of these occurs for a relatively long time, the recording and detailed analysis of acceleration measurement data can be restricted, that is to say can be carried out on a "sample basis" only in time periods which are relatively widely spaced apart. Therefore, in particular in the sleeping phases it is possible to save energy in the device a. The device a is, of course, carried in a mobile fashion on the animal and therefore requires a battery or an accumulator.

In the process 11, the counting results of step 8 are also stored and, if appropriate, processed further to form further information, if necessary alarms etc. Likewise, if appropriate results relating to the consumption of feed or drinking can be stored and processed further.

By means of the further processing, for example the following information is generated, and can also be output:
  Number of swallowing processes per day
  Number of swallowing processes during the consumption of feed per day
  Ratio of numbers of chewing actions per swallowing process during the rumination
  Ratio of numbers of chewing actions per swallowing process during consumption of feed
  Number of swallowing processes while drinking
  Deviations from the average value of the individual numbers or ratio of numbers with respect to a standardized value (or the respective average value for the herd)
  Deviations from the average value of the individual numbers or ratio of numbers with respect to the average value for the same animal in preceding (selectable) time periods
  Information on the extent to which the above deviations are an indication of, for example, the animal being on heat yes/no, predicted optimum insemination time period, too much or too little protein . . . .
  Miscellaneous information on the state: healthy normal state, supposed milk yield.

The method according to the invention has mainly been explained and described until now with reference to the application for milk cows.

Within the scope of the activity of a person skilled in the art, said method can also be adapted for application to other animals. For this adaptation, essentially the characterizing acceleration values, variances and repetition frequencies of processes are to be identified and the evaluation methods correspondingly adjusted.

What is claimed is:

1. A system for obtaining information about a farm animal, the system comprising:
  a measuring device including:
    an acceleration sensor configured to measure acceleration data; and
    a memory configured to store the measured acceleration data, wherein the measuring device is attachable to a head of an animal;
  an evaluation device configured to:
  receive, via a wireless connection, the measured acceleration data from the measuring device;
  identify and compute a number of swallowing processes within the acceleration data;
  identify and compute a number of chewing actions based on the acceleration data;
  determine a health metric of the animal based on the number of swallowing processes and the number of chewing processes; and
  determine a quality metric of an item being chewed based on the number of swallowing processes and the number of chewing processes.

2. The system of claim 1 wherein the evaluation device is configured to:
  differentiate periods in which the animal swallows from periods in which the animal chews, and
  calculate and compare variants between the measured acceleration data during consecutive time windows.

3. The system of claim 2 wherein the number of swallowing processes and the number of chewing actions identified occurs during a threshold time.

4. The system of claim 2 wherein the period is from an end of one swallowing phase to a start of a next swallowing phase.

5. The system of claim 1 wherein the evaluation device is configured to store:
  a number of swallowing processes per day,
  a number of swallowing processes during consumption of feed per day,
  a ratio of numbers of chewing actions per swallowing process during rumination, and
  a ratio of numbers of chewing actions per swallowing process during consumption of feed.

6. The system of claim 1 wherein the evaluation device is configured to store:
  a number of swallowing processes while drinking,
  deviations from an average value of previously listed numbers and ratios corresponding to a standardized value and an average value for a herd, and
  deviations from the average value of the previously listed numbers and ratios corresponding to the average value for the same animal in preceding periods.

7. The system of claim 1 wherein the evaluation device is configured to store:
  information about the animal including: a time of mating, a predicted optimum insemination period, a ratio of long fiber content with respect to protein content in feed, a milk yield, and a state of health.

8. The system of claim 1 wherein the evaluation device is configured to:
  calculate the number of chewing actions during a period by carrying out a Fourier transformation during the period over a profile of the measured acceleration data,
  determine a fundamental frequency,
  interpret the fundamental frequency as being a chewing action frequency, and
  multiply the chewing action frequency by a length of the period.

9. The system of claim 8 wherein:
  the measuring device is configured to:
    measure acceleration in three respective coordinate directions, and
    measure acceleration vectors at individual measuring times, and
  the evaluation device is configured to:
    calculate an absolute value of each directional component of the respective acceleration vector, wherein each directional component is parallel to a respective direction assumed in a space,
    form a data series for each direction assumed in the space over a sequence of the acceleration components oriented in the respective direction, and
    perform the Fourier transformation at one or more of the data series.

10. The system of claim 9 wherein the evaluation device is configured to:
  perform the Fourier transformation for a multiplicity of data series, wherein the multiplicity of data series are each assigned to another direction in the space,
  identify a single oscillation with a highest amplitude over all the other oscillations in a frequency range that a frequency of the chewing actions occur, and interpret the single oscillation as the frequency of the chewing actions.

11. The system of claim 9 wherein the evaluation device is configured to:
  perform the Fourier transformation for a multiplicity of data series, wherein the multiplicity of data series are each assigned to another direction in the space,
  identify three oscillations with a highest amplitude over all other oscillations in a frequency range that a frequency of the chewing actions occur, wherein the three oscillations occur consecutively, and
  interpret an apex point of a parabola occurs with an axis of symmetry parallel to a coordinate direction and intersects the three oscillations as the frequency of the chewing actions.

12. The system of claim 1 wherein the evaluation device is configured to:
  count swallowing processes involved in a drinking process separately.

13. The system of claim 12 wherein the evaluation device is configured to:
  identify the drinking process by variance analysis of the measured acceleration data, wherein fluctuations in a variance profile within a predetermined frequency range are evaluated as an indication of an occurrence of the drinking process.

14. The system of claim 1 wherein the evaluation device is configured to:
  evaluate the measured acceleration data to detect whether the swallowing processes and the chewing actions occur during consumption of feed or during rumination, and wherein the swallowing processes during consumption of feed are counted separately from swallowing processes during rumination.

15. The system of claim 1 wherein the evaluation device is configured to:
  determine, using the measured acceleration data, a measured value of a quantifiable variable corresponding to an instantaneous state of a ruminating process, wherein the farm animal is a ruminant.

16. The system of claim 15 wherein the evaluation device is configured to:
  assign, based on the measured acceleration data, individual acceleration data items including a chewing phase or a regurgitating phase of the ruminating process, and
  evaluate individual acceleration data items assigned to the chewing phase.

17. The system of claim 16 wherein the evaluation device is configured to:
  calculate a variance of the measured acceleration data or a variable correlating to the variance of the measured acceleration data over two time windows, wherein the two time windows are consecutive and correspond to a period during measuring of acceleration data, and
  interpret a difference of the variance over the two time windows as a change between the chewing phase and the regurgitating phase of the ruminating process.

18. The system of claim 16 wherein the evaluation device is configured to:
  assign the measured acceleration data to the chewing phase or the regurgitating phase based on a series of successive acceleration values of the measured acceleration data, wherein each signify an absolute value of a total acceleration at a measuring time and can be calculated for the respective measuring time by geometric addition of individual acceleration values measured in individual coordination directions at the respective measuring time.

19. The system of claim 16 wherein the evaluation device is configured to:
  calculate a number of chewing actions per portion of feed by multiplying a frequency of the chewing actions by a duration of the chewing phase.

* * * * *